US005452975A

United States Patent [19]

Grant

[11] Patent Number: 5,452,975

[45] Date of Patent: Sep. 26, 1995

[54] CONNECTOR DEVICE, AND CONNECTION ASSEMBLY COMPRISING SAME

[76] Inventor: Jerry A. Grant, 1902 Windsong Rd., Sanford, N.C. 27330

[21] Appl. No.: 93,997

[22] Filed: Jul. 19, 1993

[51] Int. Cl.$^6$ .............. F16B 13/04

[52] U.S. Cl. .............. 411/22; 411/34

[58] Field of Search .............. 439/345, 372; 411/21, 22, 23, 34

[56] References Cited

U.S. PATENT DOCUMENTS

| | | | |
|---|---|---|---|
| 1,487,290 | 3/1924 | Thomkinson | 411/23 |
| 2,213,818 | 9/1940 | Krause | 411/19 |
| 2,688,894 | 9/1954 | Modrey | 411/34 |
| 3,504,107 | 3/1970 | Iantorno et al. | 411/34 |
| 3,673,913 | 4/1972 | Barry | 411/34 |
| 3,675,531 | 7/1972 | Lehman | 411/34 |
| 4,405,272 | 9/1983 | Wollar | 411/41 |
| 4,693,652 | 9/1987 | Sweeney | 411/23 |
| 5,147,167 | 9/1992 | Berecz et al. | 411/44 |

FOREIGN PATENT DOCUMENTS

| | | | |
|---|---|---|---|
| 990103 | 9/1951 | France . | |
| 371242 | 9/1963 | Switzerland . | |
| 628912 | 9/1949 | United Kingdom | 411/22 |

*Primary Examiner*—Neil Abrams

*Attorney, Agent, or Firm*—Steven J. Hultquist

[57] ABSTRACT

A pressure-extrusion mechanical connector for interconnecting first and second structural elements, and including: a connector housing member coupled or coupleable to one of the first and second structural elements, with an interior volume in the housing member and an egress opening in the housing member communicating with the interior volume therein; an occlusion element arranged for selective translation into the interior volume, to correspondingly occlude at least a portion of the interior volume of the housing member; and a pressure-extrudable material, e.g., an elastomeric thermoplastic polymer, disposed in the interior volume. Pressure is selectively exertable on the pressure-extrudable material by the occlusion element when translated into the interior volume of the housing member, so that upon such translation, the pressure-extrudable material is extruded through the egress opening exteriorly of the housing, to form a gripping or locking extruded member. The extrudate locking portion of the pressure-extrudable material may for example be received within a cavity of a recipient structural member, or simply provide an extended area extrudate mass around the periphery of an opening through which the housing member is passed, for interconnection of the desired structural elements. The connector of the invention may be usefully employed for connection of cables to ports of personal computer systems, as well as for securing expansion cards and the like in the CPU of a computer system.

21 Claims, 5 Drawing Sheets

CONNECTOR DEVICE, AND CONNECTION ASSEMBLY COMPRISING SAME

BACKGROUND OF THE INVENTION

1. Field of the Invention

This invention relates generally to connector devices for mechanically interconnecting structural members and assemblies.

2. Description of the Related Art

Connectors of widely varying type are commonly employed to interconnect structural members and assemblies. Connector devices which are in common use include screw-type connectors such as those used to connect computer output ports to cabling for interconnection of the computer (central processing unit) to computer peripherals such as printers, monitors, additional keyboards, CD-ROM drives, etc. However, these types of connectors are not without inherent deficiencies. For example, in many circumstances, computers and similar equipment may be positioned in desks or work stations where the connector ports and mating structures are in difficult-to-reach locations. As a result, when cables must be connected or disconnected for installation, maintenance, relocation, or modification (reconfiguring) of the apparatus, connection/disconnection of the cables often becomes a tedious task. Furthermore, personnel working with such cables and screw-type connectors may inadvertently "strip out" the threading of the small screws of such connectors and/or uncouple the screws from the connector. A universal problem also exists with the small screws used to connect special function circuit boards to the frame in personal computers, in that the screws are often dropped onto the underlying circuit board(s) and can result in damage to delicate circuits. Other applications also exist in which these deficiencies in screw-type connectors are not infrequently experienced.

In addition, circumstances may exist where the apparatus incorporating the screw-type connector is moved or reconfigured with regularity, necessitating successive attachment and disengagement of the screw-type connector. This results in a high level of wear and tear on the connecting screws of the connector and the associated tapped threading with which the connector screws are mated, in addition to susceptibility to stripped threading on the screws or in the recipient tapped structure.

In other circumstances, such as those involving "safety equipment" requiring quick and ready access in cases of emergency, it would be of great benefit to quickly remove covering panels which typically are secured by screws or similar mechanical fasteners, in order to gain access to equipment elements or components which are covered by such secured panels.

Accordingly, it would be a substantial advance in the art to provide a connector device of an improved character which is readily engageable and disengageable with respect to structural elements or members to be interconnected thereby, which is simple in construction, readily and easily employed, and which may be mass-produced at low cost.

Accordingly, it is an object of the invention to provide a connector device of such type.

Another object of the present invention is to provide an improved connector having an extended service life.

Another object of the present invention is to provide an improved threadless connector.

Still another object of the present invention is to provide an improved connector that may be quickly engaged with a recipient structure, and quickly removed therefrom when desired.

Yet another object of the present invention is to provide an improved connector that is simple to manufacture and assemble.

A further object of the present invention is to provide an improved connector of unitary construction.

Other objects and advantages of the present invention will be more fully apparent from the ensuing disclosure and appended claims.

SUMMARY OF THE INVENTION

In a broad aspect, the present invention relates to a pressure-extrusion mechanical connector for interconnection of first and second structural elements. The connector comprises a connector housing member coupled to one of the aforementioned first and second structural elements, and having an interior volume within the housing member and an egress opening in the housing member communicating with the interior volume. An occlusion element is provided which is selectively translatable into the interior volume of the housing member, to correspondingly occlude at least a portion of the interior volume of the housing member. A pressure-extrudable material is disposed in the interior volume. Pressure is selectively exertable on the pressure-extrudable material by the occlusion element when the occlusion element is selectively translated into the interior volume of the housing member, to pressure-extrude the material through the egress opening exteriorly of the housing member. In this manner, an exteriorly pressure-extruded portion of the material is formed, which is coupleable with the other of the aforementioned first and second structural elements, for interconnection of the first and second structural elements via the connector.

As used herein, the term "pressure-extrudable material" refers to material which under the imposition of pressure thereon while reposed in the interior volume of the housing member is sufficiently deformable and/or displaceable to pass through the egress opening to the exterior of the housing member. Such exterior displacement or deformation out of the interior volume of the housing member to the exterior thereof provides an externalized portion of the material, by means of which the extruded portion can interlockingly associate with recipient structure or components. For example, the extruded material may pass into a recipient cavity and provide a mechanical locking of the housing member to a plate or other structure containing the recipient cavity. The extruded mass alternatively may be itself gripped, compression-restrained or otherwise couplingly be employed to effect the mechanical connection.

The mechanical connector of the invention may be constructed for sequential connection and disconnection in any suitable manner, as for example by securement of a plunger element or other retraction member to the pressure-extrudable material, whereby it may be withdrawn or retracted through the egress opening back into the volume of the housing member, subsequent to the initial pressure-extrusion formation of the mechanical connection.

In another aspect, the invention relates a pressure-extrusion mechanical connector for joining a first coupleable structural assembly to a second coupleable assembly, so that the first and the second structural assemblies are structurally coupled to one another. The mechanical connector comprises a housing member having an egress opening therein and defining an interior volume within the housing member. Also provided is a manually actuatable plunger element for selectively occluding a portion of the interior volume of the housing member when the plunger element is manually translated into the housing. A pressure-extrudable material is disposed in the interior volume on which pressure is selectively exertable by the plunger element when manually translated to occlude the selected portion of the interior volume of the housing member, to pressure-extrude the pressure-extrudable material through the egress opening exteriorly of the housing member. A cavity-forming recipient member defining a cavity therewithin is also provided, with the cavity-forming member arranged in recipient relationship to the egress opening for receiving the pressure-extruded elastomeric material into the cavity in an expanded state relative to confinement thereof in the interior volume of the housing member, to effect mechanical interconnection between the housing member and the cavity-forming member. Thus, the housing member when secured to one of the first and second structural assemblies and the cavity-forming member when secured to the other of the first and second structural assemblies (or the cavity-forming member itself being such other structural assembly, permits coupling of the first and second structural assemblies by the connector.

Other aspects, features, and embodiments of the invention will be more fully apparent from the ensuing disclosure and appended claims.

DETAILED DESCRIPTION OF THE INVENTION AND PREFERRED EMBODIMENTS THEREOF

While the present invention will be described more fully hereinafter, it is to be understood at the outset that persons of skill in the art may modify the invention herein described while still achieving the favorable results of this invention. Accordingly, the description which follows is to be understood as being a broad teaching disclosure directed to persons of skill in the appropriate art, and not as limiting upon the present invention.

Figure 1:
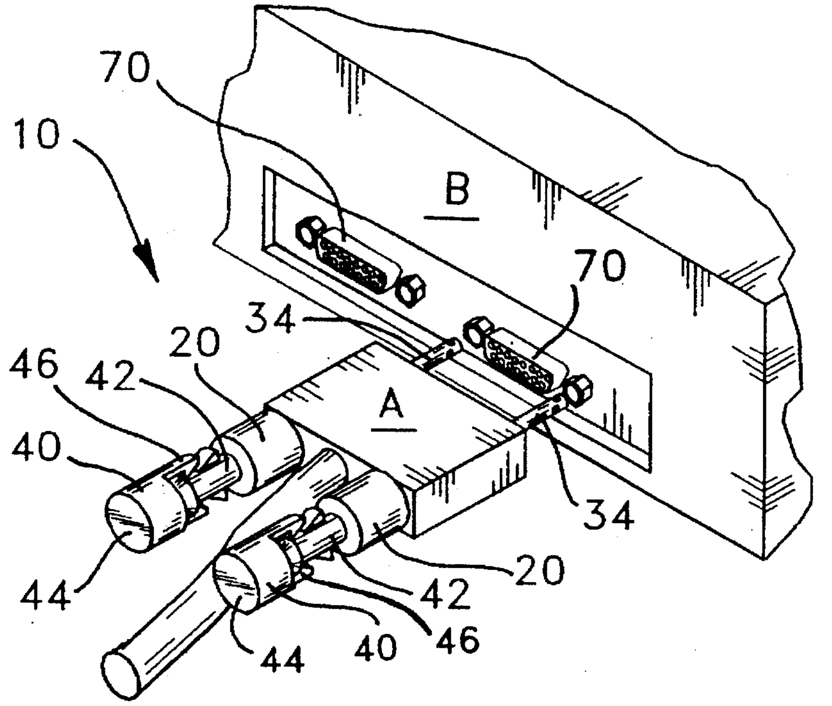
FIG. 1 is a perspective view of a connector according to one embodiment of the present invention, wherein a first structural assembly is being coupled to a second structural assembly and the plunger is shown in the release position.
Figure 2:
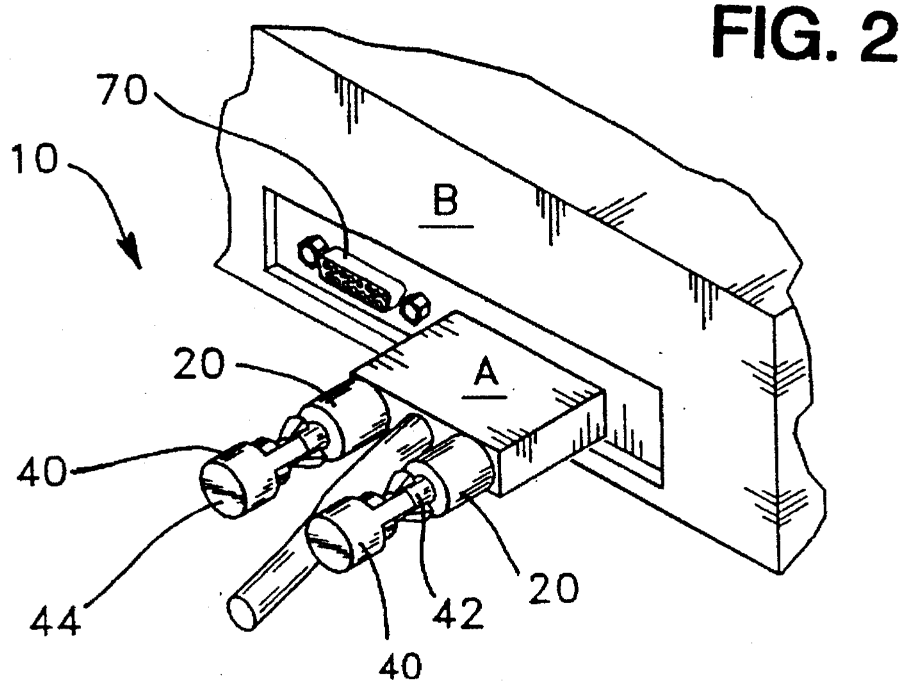
FIG. 2 is a perspective view of the connector of FIG. 1, wherein the first structural assembly is coupled to a second structural assembly, with the plunger being translated to the connecting position.
Figure 3:
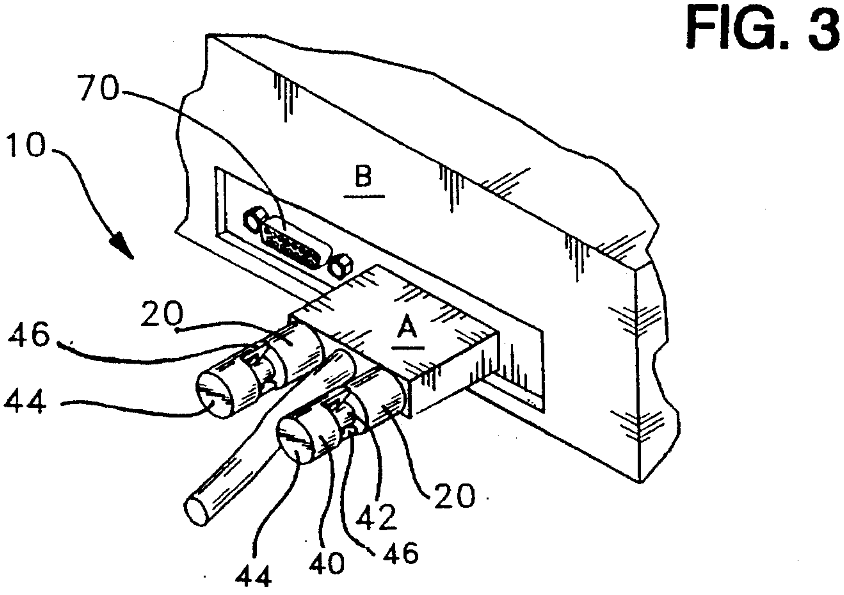
FIG. 3 a perspective view of the connector of FIG. 1 and 2, wherein the first structural assembly is coupled to a second structural assembly, with the plunger in the connecting position.
Figure 4:
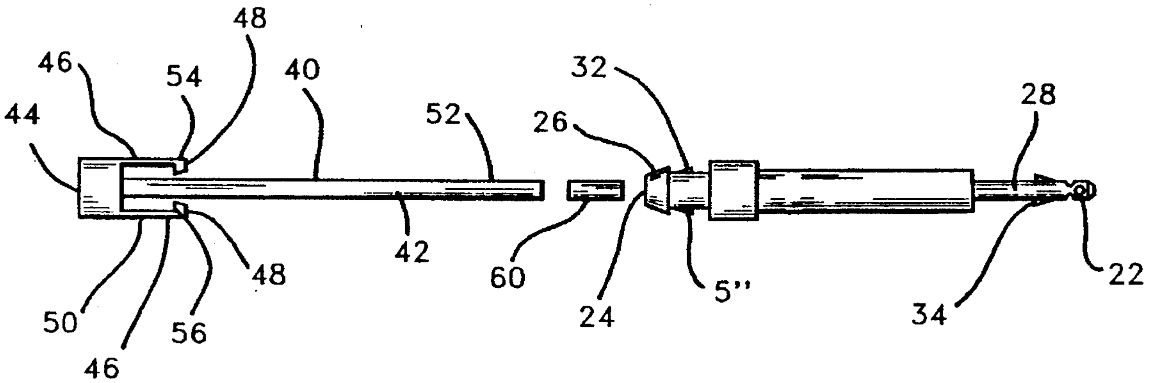
FIG. 4 is an exploded view of a connector according to one embodiment of the present invention, showing the housing member, pressure-extrudable material and the plunger.
Figure 5:
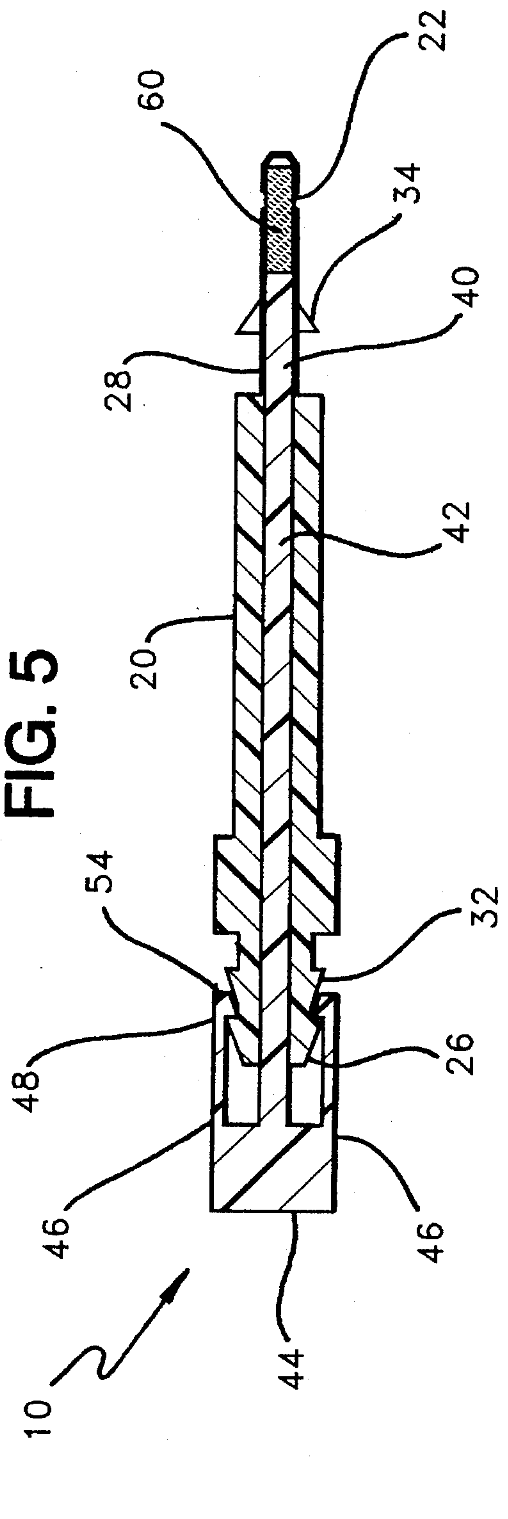
FIG. 5 is a broken-away view of the connector of FIG. 4, with the plunger in the release position.
Figure 6:
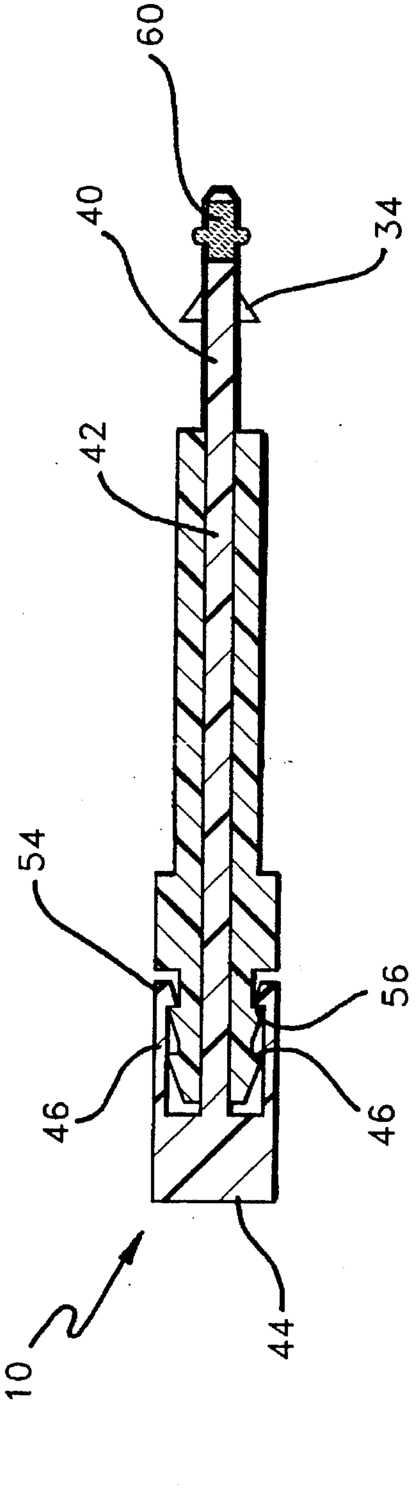
FIG. 6 is a broken-away view of the connector of FIGS. 4 and 5, with the plunger in the connecting position and the pressure-extrudable material extruded out of the egress opening.

Referring more particularly to the drawings, a connector according to one embodiment of the present invention is indicated generally at 10 in FIGS. 1–3. The connector 10 is adapted to be used to connect a first structural assembly A (such as a computer cable) to a second structural assembly B (such as the corresponding plug in a computer or computer peripheral) as illustrated in FIGS. 1 through 3.

In FIGS. 4–8, the connector 10 is disclosed therein in detail, in various embodiments. The connector 10 comprises a connector housing member 20, and may be utilized with a corresponding cavity-forming recipient member 70, or alternatively, the pressure-extrudable material may simply be extruded into the exterior environment of the housing member, as shown in FIG. 8E, so that the extruded material itself serves as a coupling and/or retention element of the connector.

The connector housing member 20 includes a hole defining an egress opening 22 therein, and an interior volume is defined within the housing member. The egress opening may comprise a single opening or multiple openings, of any suitable size and shape, as appropriate to the specific end use of the invention. The housing member preferably is formed of metal or alternatively may be molded from a strong durable plastic such as polypropylene, polycarbonate, polysulfone, or a fiber-reinforced composite material such as a graphite fiber-reinforced epoxy matrix material. The housing member 20 shown in this illustrative embodiment may take the form of an elongate hollow cylinder having a bore 24 and a circular disk or annulus 26 extending about the periphery of one end. The annulus 26 is angled outwardly so that its diameter at the upper end of the housing is smaller than its diameter at the lower end thereof, forming a barb-like projection. A second annulus 32 is located below the first and is similarly shaped except that it is divided into two sections located on opposite sides of the housing, each of which extends slightly less than twenty-five percent of the diameter of the housing 20. Other annular elements of corresponding structure may be utilized, e.g., on the tip 28, as necessary or desirable to retain the connector within the first coupleable structural assembly.

Figure 7A:
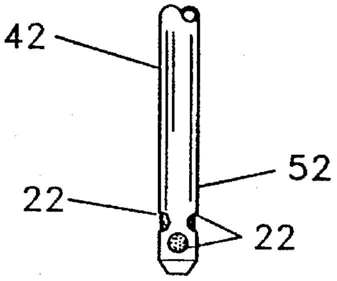
FIGS. 7A, 7B and 7C are side views of different embodiments of the end of the housing member tip that is inserted into the cavity member.
Figure 7B:
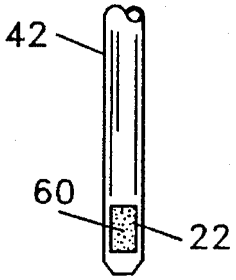

The lower portion of the housing 20 includes a tip 28 that has a diameter smaller than the diameter of the upper portion of the housing. As illustrated in FIGS. 7A, B, and C, the terminating (distal) end of the tip 28 includes a plurality of holes defining egress openings 22, for passage of pressure-extrudable material therethrough, as hereinafter more fully described.

Figure 7C:
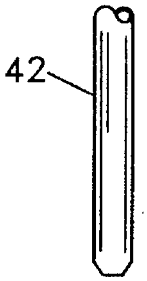

In the embodiment illustrated in FIG. 7C, the tip of the housing member, rather than having openings, is itself made of a flexible, deformable material such as polypropylene, of a thin-walled character, whereby the extremity (distal) portion of the tip is pressure-enlargeable, upon exertion of pressure on the pressure-extrudable material within the tip member itself. In such embodiment, the bore within the tip member serves as a pressure-extrudable material flow passage and opening.

A manually actuatable plunger element or plunger 40 is provided for selectively occluding at least a portion of the interior volume of the housing member 20, upon translation of the plunger into the interior volume. The plunger 40 comprises an elongate shaft 42 with an end cap member 44 at one end. The end cap 44 is of a circular disk-shape and is molded with the shaft 42 and includes a pair of downwardly extending arms 46 positioned on opposite sides thereof. The arms 46 extend about the periphery of the cap 44 and occupy an arc of slightly less than one-fourth of the circumference of the cap. At the terminating end of each of the arms 46 is an inwardly extending lip 48 that cooperates with the second annulus to lock the plunger 40 in the translated position, as more specifically described hereinafter.

The shaft 42 is of a diameter that permits reciprocating (forward as well as rearward) movement within the housing member 20 along the entire length thereof. The plunger includes a gripping end 50 which extends exteriorly of the volume of the housing member 20 and an opposite end 52 which is positioned for translational movement within the housing member. The plunger element 40 also includes a locking means 54 for maintaining the housing member 20 and the plunger element in coupled relation. The locking means 54 comprises a first locking surface 56 on the plunger and a second locking surface 57 on the housing. The first and second locking surfaces are adapted to enter into interlocking relation when the plunger is translated into the housing member.

A pressure-extrudable material 60, preferably an elastomeric, pressure-flowable material 60 is disposed in the interior volume of the housing 20 in operative association with the opposite end of the plunger element. The pressure-extrudable, preferably elastomeric, material may for example be in the form of a cylindrical "slug" of a diameter that may be inserted into the interior volume of the housing member and into position within the tip 28 adjacent the egress opening 22. This pressure-extrudable material slug preferrably is of sufficient length to be extrudable out of the egress opening without becoming dislodged from within the interior volume. The pressure-extrudable material may be of any suitable type, elastomeric or non-elastomeric in character, which is compatible with the connector structure and its mode of operation. The pressure-extrudable material may for example comprise a thermoplastic elastomeric material, a natural or synthetic rubber, etc.

Illustrative of thermoplastic elastomeric materials which may find utility as the elastomeric element 60 in the broad practice of the present invention are: polyurethane materials, as for example the polyester-based polyurethane material commercially available from Mobay Corporation (Plastics and Rubber Division, Pittsburgh, Pa.) under the trademark Texin, and the thermoplastic polyurethane elastomers which are commercially available from BASF Corporation (Parsippany, N.J.) under the trademark Elastollan; polyester elastomers, such as the block copolymers of polybutylene terephthalate and long-chain polyether gylcols, which are available commercially from E. I. Du Pont de Nemours and Company, Inc. (Polymer Products Department, Engineering Polymers Division, Wilmington, Del.) under the trademark HYTREL; polyether block amides, such as those commercially available from Atochem, Inc. (Glenrock, N.J.) under the trademark Pebax; multiblock rubber-based copolymers, particularly those in which the rubber block component is based on butadiene, isoprene, or ethylene/butylene, such as the multiblock rubber-based copolymers commercially available from Shell Chemical Company (Houston, Tex.: under the trademark Kraton; ethylene-octane copolymers such as those commercially available from The Dow Chemical Company (Midland, Mich.) under the trademark ATTANE, as well as any other suitable homopolymers and copolymers, and mixtures, alloys and composites thereof.

Among the foregoing materials, polyether- and polyester-based polyurethanes, and multiblock rubber-based copolymers are most particularly preferred. The most preferred thermoplastic materials for forming the elastomeric connecting element in accordance with the present invention are the aforementioned thermoplastic polyurethane elastomers commercially available under the trademark Elastollan, to which any one of the well-known plasticizers may be added in order to obtain the appropriate combination of memory, stiffness and flexure for a given application.

The connector 10 is assembled by inserting the elastomeric element 60 into the interior volume of the housing member 20. The plunger element 40 then is also inserted into the interior volume of the housing member 20 a sufficient distance so that the arms 46 on the end cap 44 pass over and lock around the upper annulus 26 of the housing member. Due to the barb-like configuration of the annulus 26, the arms become locked to the housing. The elongate shaft 42 is positioned within bore 24 proximate the pressure-extrudable material 60 so that the connector interior volume contains the tip extremity of shaft 42 in pressure-extrudable translational relationship to the pressure-extrudable material.

Figure 8A:
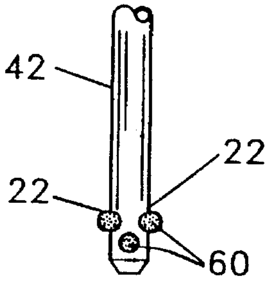
FIGS. 8A, 8B and 8C are side views of the embodiments of the end of the housing member tip illustrating the pressure-extrudable material in the extruded state.
Figure 8B:
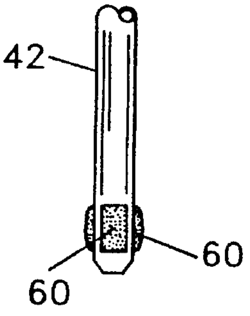
Figure 8C:
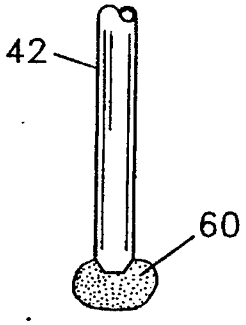
Figure 8D:
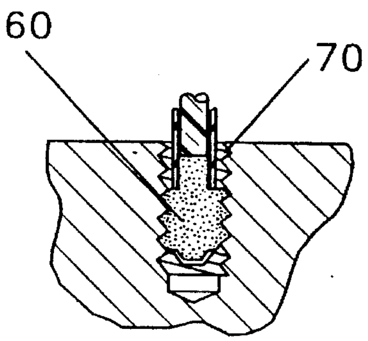
FIG. 8D illustrates the tip of the housing member of FIG. 8B in a threaded cavity.
Figure 8E:
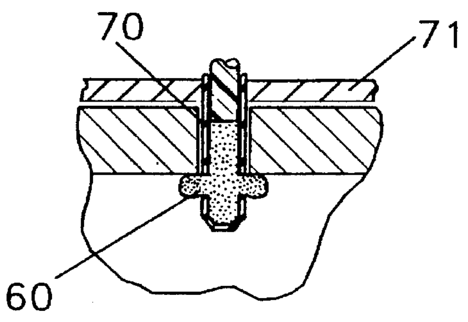
FIG. 8E illustrates the tip of the housing member of FIG. 8B inserted into a cavity-forming member such as an opening in an electrical panel, with the housing member itself being secured to a separate panel member.

A cavity-forming or other recipient member 70 is adapted to receive the tip 28 of housing member 20. The cavity-forming member 70 may be a female-type receiving cavity such as those illustrated in FIGS. 8D and 8E. The cavity of FIG. 8D is a threaded screw hole such as may be provided for conventional threaded fastener connectors. The cavity in FIG. 8E is simply the space behind a panel opening, in which the panel itself restricts the removal of the pressure-extrudable material once extruded. In the embodiment shown in FIG. 8E, the connector housing is itself secured as a unitary structure to panel 71, whereby the respective panels constitute the structures to be coupled via the connector.

In operation, referring to FIGS. 1–6, the connector 10 is inserted into the first structural assembly A so that the portion of the tip 28 that includes the egress opening 22 protrudes out of the back side of the assembly. The annulus 34 on the housing member 20 (see FIG. 4) locks the housing member into position within the first structural assembly A. This prevents the housing member from accidentally disengaging from the structural assembly member A prior to securing the connector in operative coupling relationship to the interconnectable structures. When connecting the first structural assembly A to the second structural assembly B, the connector housing member 20 is positioned in contacting aligned relationship to the cavity-comprising member 70, so that the egress opening 22 of the housing member is inserted into the cavity-comprising member 70, e.g., as illustrated in FIG. 8D, or it may alternatively be inserted into another type of restraining opening such as that illustrated in FIG. 8E. To complete the connection of the first structural member A to the second structural member B, pressure is manually applied to the gripping end of the plunger, which thereby is manually translated into the housing 20, to occlude a portion of the interior volume of the housing member and cause pressure-extrusion of extrudable (elastomeric) material through egress opening 22, exteriorly of the housing member and into the cavity in recipient member 70. Upon such translation of the plunger, the plunger arms 46 are translated past the second annulus 32 and when it is desired to lock the plunger 40 in such translated position, the plunger is rotated through an arc of one-fourth of its perimeter, thus causing the arms 48 to enter into interlocking engagement with the locking surface 57, which causes the plunger to remain in the translated position. When it is desired to unlock the connector 10 from the cavity in member 70, the plunger 40 is rotated in the reverse direction, releasing the arms 46 and freeing them for movement back to the rearwardly withdrawn position. This releases the pressure on the pressure-extrudable material 60 and causes it to be retracted back into the tip of the housing 20, whereupon the housing member may be separated from the cavity-forming member 70.

As previously discussed, the plunger at its distal end may be bonded, mechanically affixed, or otherwise secured to the mass of pressure-extrudable material, to facilitate or enhance retraction of the previously extruded material through the egress opening(s) and back into the interior volume of the housing member.

Figure 9:
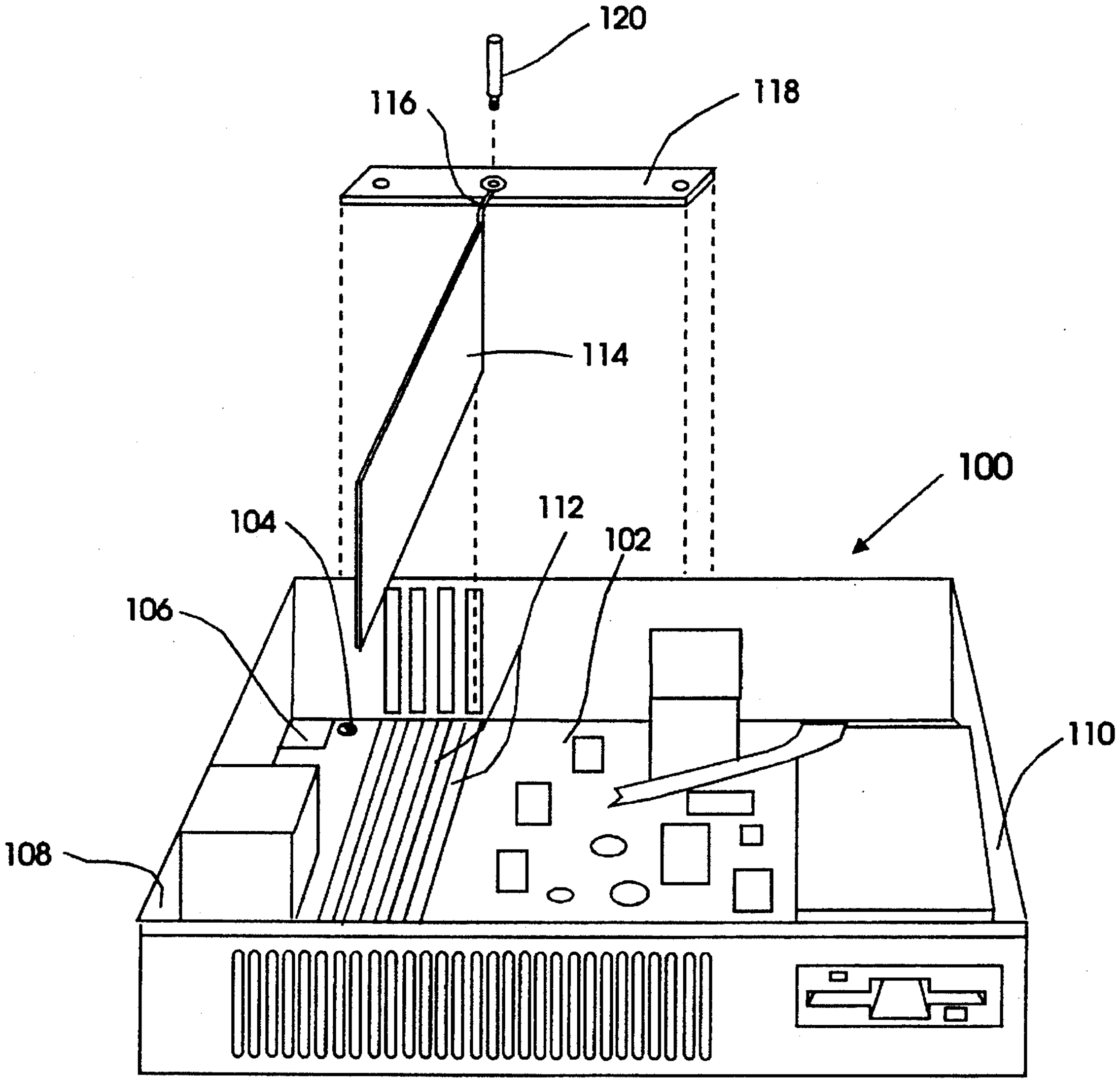
FIG. 9 is a perspective view of a circuit card being secured to a motherboard within the housing of a computer unit, utilizing a connector according to one embodiment of the present invention.

FIG. 9 is a perspective exploded view of a portion of a central processing unit (CPU) 100 of a personal computer, featuring a motherboard 102 secured by mechanical fasteners 104 to the base 106 of a CPU housing including side walls 108 and 110. The motherboard 102 features a series of expansion card slots 112, into which additional microcircuitry cards 114 may be selectively inserted, in a manner well known in the art. As shown in FIG. 9, the expansion card 114 features at its upper right-hand corner a connector strap 116 for attaching the card to an electrical connection strip 118 by means of a mechanical connector 120 which is constructed in accordance with the present invention. In the prior art, such expansion cards have been coupled with very small screws or other mechanical threaded fasteners, an expedient which has frequently resulted in such screws or other mechanical fasteners dropping into the recesses of the motherboard, where they can lodge between microelectronics components and/or portions otherwise effect damage, e.g. by their initial impact or, more frequently, by the subsequent attempt to retrieve the mechanical fastener from the interior recesses of the CPU housing, which frequently is filled with hard drive and disk drive components, fans, and other CPU components which render the dropped fastener very difficult to remove. Accordingly, in such applications, the connector device of the present invention achieves a substantial advance in the art, permitting the coupling of the connector strap or other structure with recipient structure in the CPU housing, without the necessity of attempting to thread a threaded mechanical fastener, which prior to "seating" or mating with complementary threading in a recipient structure is high susceptible to being dropped into the interior recesses of the CPU housing.

While the invention has been described herein with reference to specific aspects, features, and embodiments it will be recognized that many variations, modifications, and alternative embodiments are possible, within the spirit and scope of the present invention.

What is claimed is:

1. A pressure-extrusion mechanical connector for coupling and uncoupling first and second structural elements, comprising:

a connector housing member joined or joinable to one of said first and second structural elements, and having an interior volume therewithin and at least one egress opening in the housing member communicating with said interior volume;

a threadless occlusion element which is selectively translatable within the interior volume of the housing member, to occlude at least a portion of the interior volume of the housing member; and a pressure-extrudable material in said interior volume on which pressure may be selectively exterted or removed by the occlusion element when the occlusion element is selectively translated within the interior volume of the housing member, to alternatively:

(1) pressure extrude said material through said egress opening exteriorly of the housing member, thereby forming an exteriorly pressure-extruded portion of said material which is coupleable with the other of said first and second structural elements, for interconnection of said first and second structural elements by said connector, or (2) retract said pressure-extrudable material from said egress opening to uncouple said first and second structural elements.

2. A pressure-extrusion mechanical connector according to claim 1, wherein said other of said first and second structural members comprises a cavity therewithin, with said cavity arranged in recipient relationship to the egress opening for receiving the pressure-extruded material into the cavity in a pressure-extruded state relative to confinement thereof in said interior volume of the housing member, to thereby effect interconnection between the first and second structural members.

3. A pressure-extrusion mechanical connector according to claim 1, wherein the pressure-extrudable material comprises an elastomeric material.

4. A pressure-extrusion mechanical connector for coupling and uncoupling a first coupleable structural assembly to a second coupleable structural assembly, the mechanical connector comprising:

a threadless connector housing member having an egress opening therein and defining an interior volume within the housing member;

a manually actuatable threadless plunger element for selectively occluding a portion of the interior volume of the housing member when the plunger element is manually translated into the housing;

an elastomeric, pressure-flowable material disposed in said interior volume on which pressure may be selectively exerted or removed by the plunger element when manually translated to occlude said selected portion of the interior volume of the housing member, to alternatively pressure-extrude said elastomeric material through said egress opening exteriorly of the housing member, or retract said pressure-extrudable material from said egress opening; and a cavity-forming recipient member defining a cavity therewithin, with said cavity-forming member arranged in recipient relationship to the egress opening for receiving the pressure-extruded elastomeric material into said cavity in an extended state relative to confinement thereof in said interior volume of the housing member, to effect mechanical interconnection between the housing member and the cavity forming member;

whereby the housing member when secured to one of said first and second structural assemblies and the cavity-forming member when secured to the other of said first and second structural assemblies, permits coupling of the first and second structural assemblies.

5. The pressure-extrusion mechanical connector according to claim 4, further including a locking means for locking said plunger element in a translated position within the housing member, thereby maintaining said housing member and said cavity-forming member in a coupled relation.

6. The pressure-extrusion mechanical connector according to claim 4, wherein said plunger element reciprocates between a release position wherein said housing member and said cavity-forming member are uncoupled and a connecting position wherein said elastomeric material is pressure-extruded to couple said housing member and said cavity-forming member.

7. The pressure-extrusion mechanical connector according to claim 4, wherein said plunger includes a gripping end which extends exteriorly of the volume of the housing member and an opposite end which is positioned for reciprocating movement within said housing member, and wherein said elastomeric material is in operative association with said opposite end.

8. The pressure-extrusion mechanical connector according to claim 5, further comprising a first locking surface on said plunger element and a second locking surface on said housing member, wherein said first and second locking surfaces are adapted to enter into interlocking relation when said plunger element is translated into the housing member;

whereby when the plunger element is translated into the housing member and the respective locking surfaces enter into said interlocking relation, the elastomeric material is maintained in the extended state within the housing member and the cavity-forming member and the connection therebetween is maintained. .

9. The pressure-extrusion mechanical connector according to claim 8, wherein said plunger element includes a first connecting annulus, and wherein said housing member includes a second connecting annulus, said respective first connecting annulus and said second connecting annulus being adapted to enter into contacting interlocking relation upon translation of the plunger element into the housing member, whereby upon translation of the plunger element into the housing member and rotation thereof, the first and second annuli enter into interlocking relation and the elastomeric material is maintained in the extended state, thereby maintaining the housing member and the cavity-forming member in coupled relation to one another.

10. A pressure-extrusion mechanical connector for coupling and uncoupling a first coupleable structural assembly to a second coupleable structural assembly, the mechanical connector comprising:

a threadless connector housing member having an egress opening therein and defining an interior volume within the housing member;

a manually actuatable threadless plunger element adapted for reciprocating movement within said housing, said plunger including a gripping end which extends exteriorly of the volume of the housing member and an opposite end which is positioned within said interior volume, an elastomeric, pressure-flowable material disposed in said interior volume in operative association with opposite end of said plunger, said elastomeric material being adapted to occlude said selected portion of the interior volume on which pressure may be selectively exerted by the plunger element when manually translated to pressure extrude said elastomeric material through said egress opening exteriorly of the housing member; and a cavity-forming recipient member defining a cavity therewithin, with said cavity-forming member arranged in recipient relationship to the egress opening for receiving the pressure-extruded elastomeric material into said cavity in an extended state relative to confinement thereof in said interior volume of the housing member, to effect mechanical interconnection between the housing member and the cavity-forming member;

whereby the housing member when secured to one of said first and second structural assemblies and the cavity-forming member when secured to the other of said first and second structural assemblies, permits coupling of the first and second structural assemblies.

11. A method of coupling and uncoupling a first coupleable structural assembly mounting a connector housing member, to a second coupleable structural assembly mountiong a cavity-forming recipient member, comprising the steps of:

(a) providing a connector housing member having at least one egress opening therein and defining an interior volume within the housing member, the housing member including a threadless, manually actuatable plunger element for selectively occluding a portion of the interior volume of the housing member when the plunger element is manually translated into the housing member, an elastomeric, pressure-flowable material disposed in said interior volume on which pressure may be selectively exerted or removed by the plunger element when manually translated to occlude the selected portion of the interior volume of the housing member to alternatively:

(1) pressure-extrude the elastomeric pressure-flowable material through the egress opening exteriorly of the housing member, or (2) retract the elastomeric pressure-flowable material from the at least one egress opening;

(b) positioning the connector housing member in contacting aligned relationship to the cavity-forming recipient member;

(c) applying pressure to the threadless plunger element to translate the threadless plunger element into the housing member and to pressure-extrude the elastomeric pressure-flowable material into the cavity-forming recipient member; and (d) expanding the elastomeric pressure-flowable material within the cavity-forming recipient member, so that the first and second structural assemblies are joined together in coupled relationship.

12. The method according to claim 11, further including the step of locking the plunger element by rotating the plunger through an arc of rotation when the plunger element is in a translated position within the housing member to pressure-extrude the elastomeric material, to thereby lock the housing member and the recipient member together.

13. A mechanical connector for coupling and uncoupling a first coupleable structural assembly to a second coupleable structural assembly mounting a recipient member and including a cavity, the mechanical connector comprising:

a threadless connector housing member defining an interior volume;

a manually actuatable threadless plunger element for selectively occluding a portion of the interior volume of the housing member when the plunger element is manually translated into the housing;

an elastomeric, pressure-flowable material disposed in said interior volume on which pressure may be selectively exerted by the plunger element when manually translated to occlude said selected portion of the interior volume, to deform and expand a portion of the housing member;

whereby the housing member when secured to one of said first and second structural assemblies, and with the other of said first and second structural assemblies including the cavity, permits coupling of the first and second structural assemblies when the housing member is inserted into the cavity and the plunger element is translated to deform the elastomeric material and the housing, thereby partially blocking the cavity and maintaining the housing member in coupled relation therewith.

14. The mechanical connector according to claim 13, further including a locking means for locking the plunger element in a translated position within the housing member, thereby maintaining said housing member and said recipient member in coupled relation.

15. The mechanical connector according to claim 13, wherein said plunger element reciprocates between a release position wherein said housing member and said recipient member are uncoupled and a connecting position wherein said elastomeric material is pressure-extruded to couple said housing member and said recipient member.

16. The mechanical connector according to claim 13, wherein said plunger includes a gripping end which extends exteriorly of the volume of the housing member and an opposite end which is positioned for reciprocating movement within said housing member, and wherein said elastomeric material is positioned proximate said opposite end for operative association therewith.

17. The mechanical connector according to claim 14, further comprising a first locking surface on said plunger element and a second locking surface on said housing member, wherein said first and second locking surfaces are adapted to engage in interlocking relation to one another when said plunger element is translated into the housing member;

whereby when the plunger element is translated into the housing member and the respective locking surfaces engage in said interlocking relation, the elastomeric pressure-flowable material is maintained in the expanded state within the housing member and the recipient member and the connection therebetween is maintained.

18. The mechanical connector according to claim 17, wherein said plunger includes a first connecting annulus, and wherein said housing includes a second connecting annulus, said first connecting annulus and said second connecting annulus being adapted to enter into contacting interlocking relationship upon translation of the plunger into the housing, so that upon translation of the plunger into the housing and rotation thereof, the first annulus and second annulus enter into interlocking relationship and the elastomeric material is maintained in the expanded state, thereby maintaining the housing member and the cavity member in coupled relationship to each other.

19. A method of coupling and uncoupling a first coupleable structural assembly mounting a connector housing member to a second coupleable structural assembly mounting a cavity-forming recipient member, comprising the steps of:

(a) providing a threadless connector housing member having an egress opening therein and defining an interior volume within the housing member, the housing member including a manually actuatable threadless plunger element for selectively occluding a portion of the interior volume of the housing member when the plunger is manually translated into the housing, an elastomeric, pressure-flowable material disposed in the interior volume on which pressure may be selectively exerted or removed by the plunger element when manually translated to occlude the selected portion of the interior volume of the housing member, to deform and expand the elastomeric material and the portion of the housing proximate thereto;

(b) positioning the threadless connector housing member so as to be in contacting aligned relation with the cavity-forming recipient member; and (c) applying pressure to the threadless plunger element to translate the plunger into the housing, thereby deforming and expanding the elastomeric material and the portion of the housing proximate thereto;

whereby the housing member, when secured to one of the first and second structural assemblies, with the cavity-forming member being secured to the other of the first and second structural assemblies, effects coupling of the first and second structural assemblies.

20. A method according to claim 19, wherein the first coupleable structure assembly comprises an electrical cable, and said second coupleable structural assembly comprises a port of a computer system.

21. A method of coupling and uncoupling a first coupleable structural assembly mounting a connector housing member, to a second coupleable structural assembly mounting a cavity-forming recipient member, comprising the steps of:

(a) providing a connector housing member having at least one egress opening therein and defining an interior volume within the housing member, the housing member including a manually actuatable plunger element for selectively occluding a portion of the interior volume of the housing member when the plunger element is manually translated into the housing member, an elastomeric, pressure-flowable material disposed in said interior volume on which pressure may be selectively exerted or removed by the plunger element when manually translated to occlude the selected portion of the interior volume of the housing member to alternatively:

(1) pressure-extrude the elastomeric pressure-flowable material through the egress opening exteriorly of the housing member, or (2) retract the elastomeric pressure-flowable material from the at least one egress opening;

(b) positioning the connector housing member in contacting aligned relationship to the cavity-forming recipient member;

(c) applying pressure to the plunger element to translate the plunger element into the housing member and to pressure-extrude the elastomeric pressure-flowable material into the cavity-forming recipient member; and (d) expanding the elastomeric pressure-flowable material within the cavity-forming recipient member, so that the first and second structural assemblies are joined together in coupled relationship.

(e) locking the plunger element by rotating the plunger through an arc of rotation when the plunger element is in a translated position within the housing member to pressure-extrude the elastomeric material, to thereby lock the housing member and the recipient member together.

* * * * *